Walter Haeussermann,
INVENTOR.

BY S. J. Rotondi,
A. T. Dupont,
and
Alvin E. Moore,
ATTORNEYS

Jan. 23, 1962 W. HAEUSSERMANN 3,017,777
SPACE VEHICLE ATTITUDE CONTROL MECHANISM
Filed Oct. 14, 1960 4 Sheets-Sheet 2

ST1, ST2, ST3, ST4, STABILIZING NETWORKS AND AMPLIFIERS

Walter Haeussermann,
INVENTOR.

BY S. J. Rotondi,
A. T. Dupont,
and
Alvin E. Moore,
ATTORNEYS.

Jan. 23, 1962    W. HAEUSSERMANN    3,017,777
SPACE VEHICLE ATTITUDE CONTROL MECHANISM
Filed Oct. 14, 1960    4 Sheets-Sheet 3

Walter Haeussermann,
INVENTOR.
S. J. Rotondi,
BY A. T. Dupont,
and
Alvin E. Moore,
ATTORNEYS.

Jan. 23, 1962 W. HAEUSSERMANN 3,017,777
SPACE VEHICLE ATTITUDE CONTROL MECHANISM
Filed Oct. 14, 1960 4 Sheets-Sheet 4

Walter Haeussermann,
INVENTOR.
S. J. Rotondi,
BY A. T. Dupont,
and
Alvin E. Moore,
ATTORNEYS.

United States Patent Office 3,017,777
Patented Jan. 23, 1962

3,017,777
SPACE VEHICLE ATTITUDE CONTROL
MECHANISM
Walter Haeussermann, Huntsville, Ala., assignor to the United States of America as represented by the Secretary of the Army
Filed Oct. 14, 1960, Ser. No. 62,811
10 Claims. (Cl. 74—5)
(Granted under Title 35, U.S. Code (1952), sec. 266)

The invention described herein may be manufactured and used by or for the Government for governmental purposes without the payment of any royalty thereon.

This invention relates to a flywheel type of mechanism for the attitude control of space vehicles. It is of use in the control of satellites or other space vehicles in general and is of especial importance when used in the space vehicle attitude control system set forth in the present inventor's copending patent application, Serial No. 792,930, filed on February 12, 1959, and now Patent No. 2,973,162. This system comprises: flywheels rotatable about the pitch, roll and yaw axes of a spacecraft, whose reaction against the vehicle changes its attitude; lightweight motors for rotating the flywheels in response to signals from an attitude-sensing system; and means for expelling material from the vehicle for major correction of its attitude when the flywheels reach a predetermined, maximum speed.

Although the use of a separate motor and reaction flywheel for each main axis is preferable for most space vehicles of over a ton in weight there are disadvantages in these three separate reaction control means. They separate the total angular momentum necessary for spatial attitude control of the vehicle into three components in the directions of the three orthogonal flywheel axes. But for any three flywheel assemblies of this type that are fixed to the vehicle (and not on a spatially-stabilized base) there is an undesirable coupling effect among them with any attitude change, and a resulting functioning that is undesirable from the point of view of power requirements. Magnetic suspension or airbearing support of the single-axis flywheel system is complicated, and complex decoupling terms are made necessary in the guidance-and-control computer.

In view of these facts, it is an object of this invention to provide a space vehicle attitude-control mechanism, that has no coupling effect between any of its three control axes.

Another object of the invention is to provide a space-vehicle, attitude-control means comprising a single, spherical, rotary mass that provides reactive force on the space vehicle for control of its attitudes about all three of its pitch, roll and yaw axes.

A further object is to provide an electric motor comprising a single spherical rotor that may be driven about any one of a multiplicity of axes and that is supported on air bearings.

Another object is to provide such a motor having a rotor that is magnetically supported in a substantially frictionless state.

The foregoing and other objects of the invention will become more apparent from the following detailed description of exemplary structure embodying the invention and from the accompanying drawings, in which.

Figure 1:
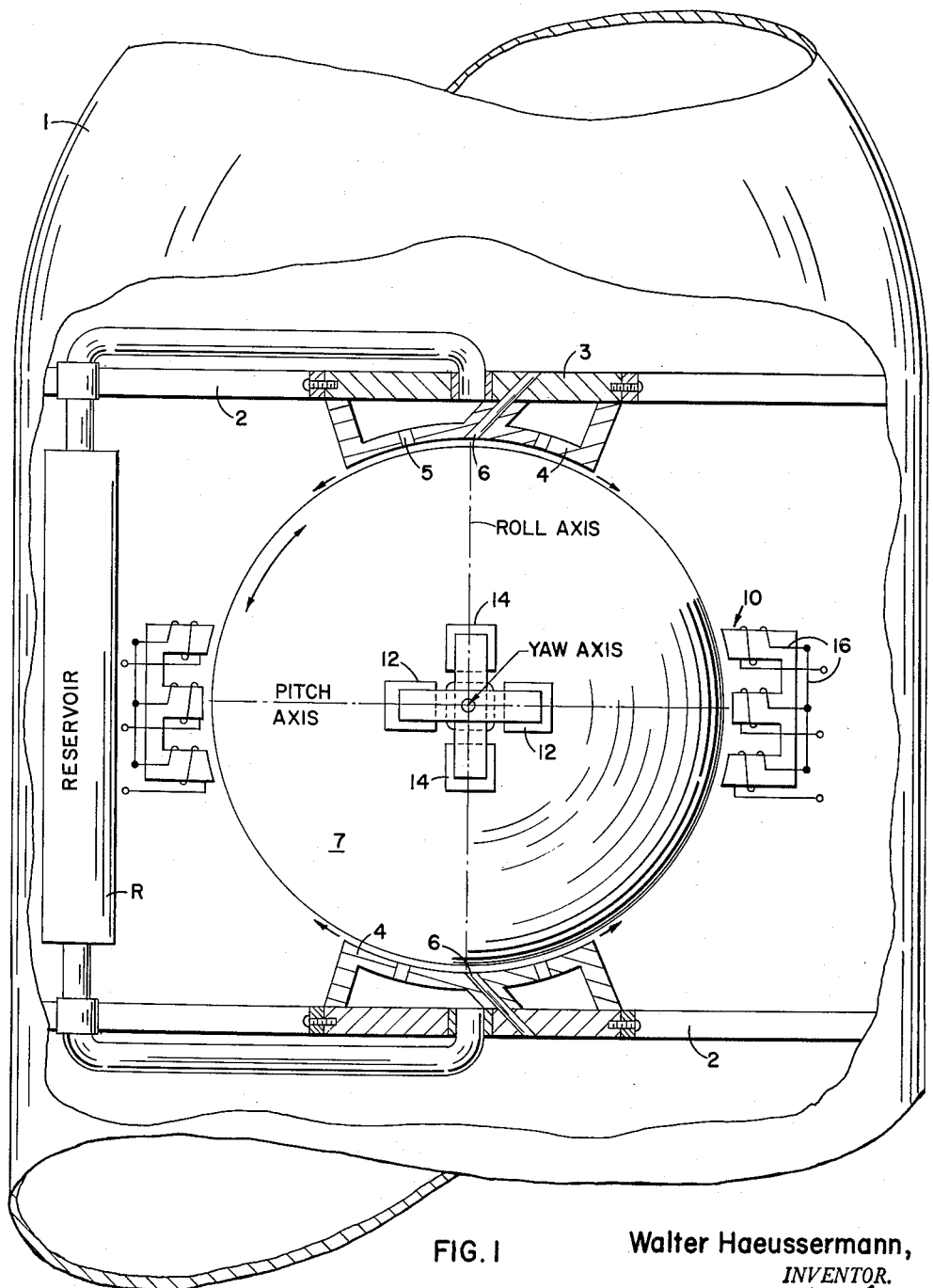
FIGURE 1 is a semi-schematic view of the invention, showing a space vehicle that is partly broken away to disclose the attitude-controlling motor and its accessories.

In FIGURE 1 an attitude-control mechanism of the invention is shown as supported within space vehicle 1 by a plurality of attachment arms 2. These arms are rigidly connected to the hull of the vehicle and to air-bearing supports 3. To supports 3 there are fixed spherical air-bearing plates or pads 4, to which compressed air or other gas is supplied via inlet ports 5 from reservoir R. Air escapes from the bearing films via port 6 and at the edges of plates 4.

Figure 7:
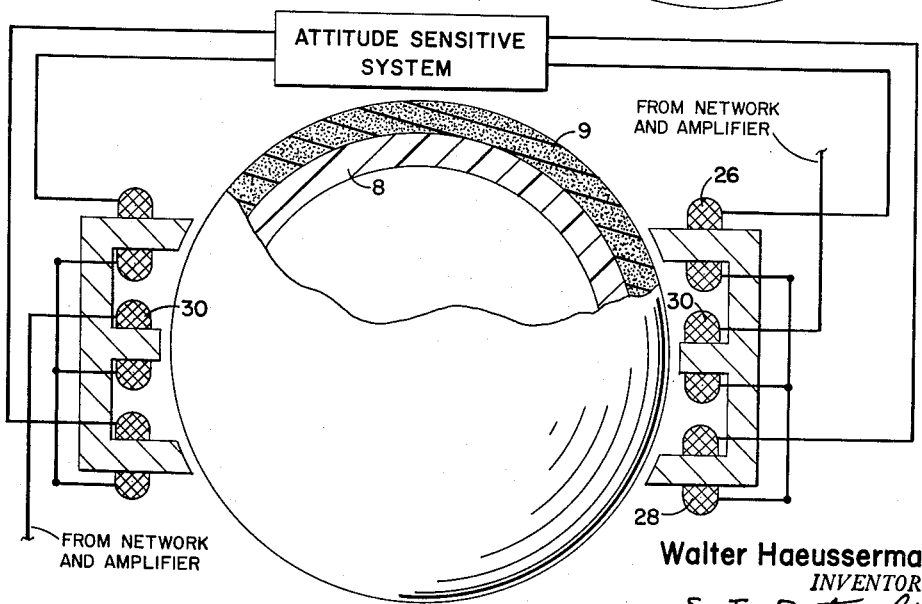
FIGURE 7 is a semi-schematic view of a spherical rotor that comprises a combined electromagnetic bearing and electromagnetic torquing system.

With almost no friction, the spherical rotor or flywheel, 7, is floated on the air-bearing films on the spherical surfaces of the pads. This rotor, as shown in FIGURE 7, is hollow and comprises a non-magnetic inner spherical layer 8 of plastic or metal and an outer magnetic shell, 9, of sintered or baked powdered ferrite, which may be in a matrix of plastic.

For rotating the spherical flywheel about the vehicle's three major axes three electromagnetic torquers are shown in FIGURE 1. Torquers 10 rotate the flywheel in either direction about the yaw axis, torquers 12 about the roll axis, and torquers 14 about the pitch axis. These torquers receive 3-phase alternating-current excitation via conductors 16 and exert an attraction on the magnetic sphere due to the hysteresis and eddy current effects in the iron-containing outer spherical shell. Conductors 16 receive current in varying amounts from a known type of space vehicle guidance system. Reversal of the phase of the alternating current causes a braking or reversal of the rotation of the flywheel.

Since the sphere may assume any position relative to the torquers it should either have a smooth surface or have pronounced markings (by magnetizing or by milling of recessions) of a high number, in order to avoid preferred axes of rotation, resulting from an undesirable coupling effect of the control axes.

For efficient control of the vehicle's attitude it is advantageous if the motor provides a torque that is a function of the control signal from the attitude information and that is independent of the actual speed of the spherical rotor. A hysteresis motor best fulfills this requirement; but in present practice only a combination of the hysteresis and the induction (eddy-current) types of motor is possible. The ferrite-containing sintered or baked material herein disclosed provides high hysteresis and low eddy-current losses and is the preferred type of magnetic material for the rotor.

Figure 2:
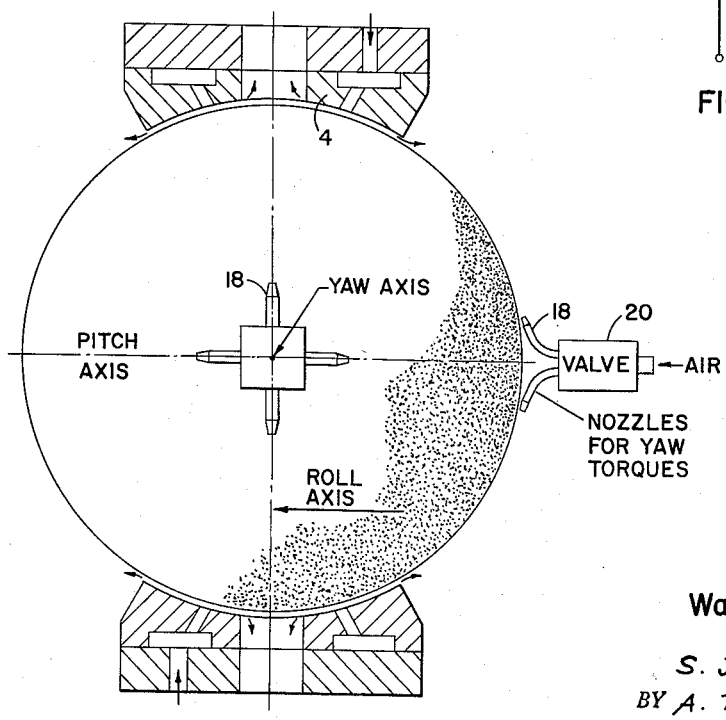
FIGURE 2 is a semi-schematic view of a spherical rotor that is turned by compressed air jets.

FIGURE 2 shows a second form of the invention. This form comprises air-bearing pads and nozzles 18 for exerting torques on the spherical flywheel by means of jets of air, each of which is controlled, in response to signals form the guidance system, by electromagnetically-operated valve 20.

Figure 3:
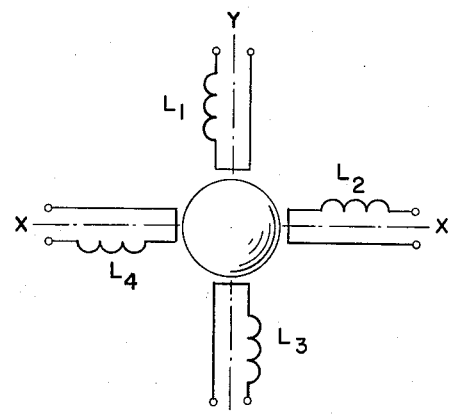
FIGURE 3 is a schematic diagram of a spherical rotor and arrangement of magnetic suspension coils for it on two axes.

In lieu of the air bearings, electromagnetic bearings are utilized in a third form of the invention. FIGURES 3 and 4 schematically show such magnetic suspension for the spherical rotor.

Figure 4:
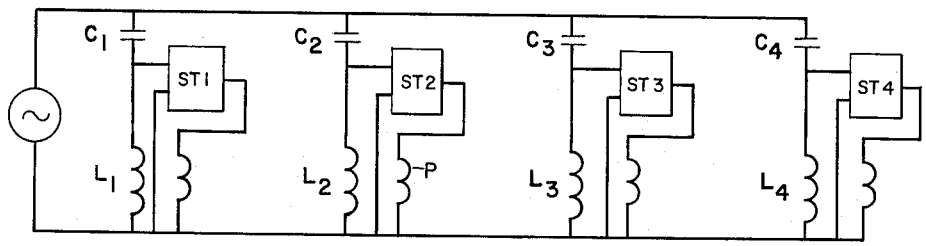
FIGURE 4 is a diagram of a circuit comprising the coils of FIGURE 3.

The support system for two axes is shown in FIGURE 3. Each supporting coil has an inductance that is in series with a capacitor. The circuit (shown in FIGURE 4) provides enough current to guarantee the magnetic support.

The inductance of each winding and thus the series resonant frequency of each leg is dependent on the position of the sphere. For example, when the vehicle receives an undesired acceleration the air gap between one or two of the coils (usually two) and the sphere becomes smaller and the inductance increases. The inductance decreases if the air gap of a coil (or pair of coils) becomes larger. Since two coils are arranged opposite to each other, the sphere will be held in the center of each pair of coils. Each series capacitor is selected to supply enough current to coil L for the coil's magnetic force to reposition the sphere in its centered position no matter how much the air gap is changed.

There is additional circuitry required to provide the necessary damping of the motions of the sphere. Since the voltage across the impedance L is proportional to the differential quotient of the current, the voltage can be used as a signal for a damping or anti-hunting circuit. This circuit consists of a demodulator, differentiating (stabilizing) network and an amplifier to provide a phase leading current through a parallel coil P or the magnetic coil (L).

Figure 5:
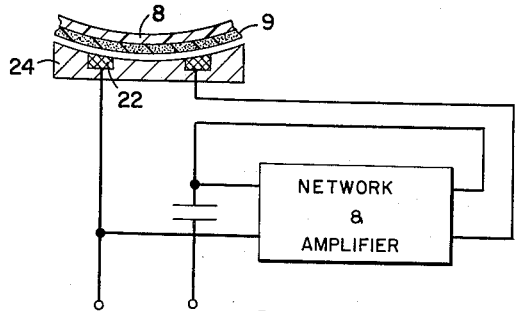
FIGURE 5 is a sectional view of one of the magnetic bearing coils, shown in connection with its stabilizing network and amplifier.

FIGURE 5 shows the structure of one of the electromagnetic devices, comprising a coil 22, embedded in a magnetic core 24.

Figure 6:
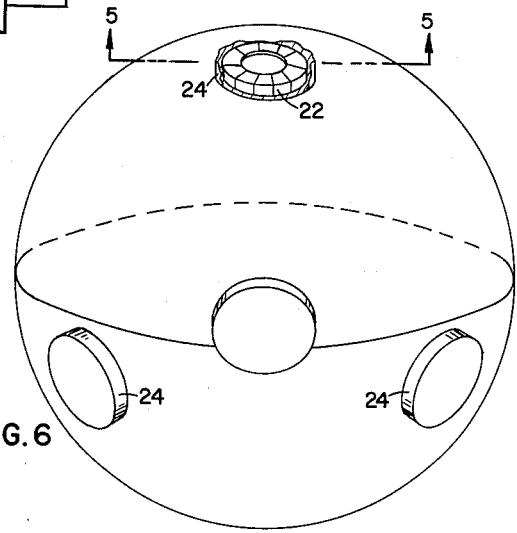
FIGURE 6 is a semi-schematic view of a spherical rotor that comprises magnetic bearing coils in the arrangement of a tetrahedron, with one of the coils exposed to view by breaking away part of the annular core.

These devices are evenly spaced from each other. Although they may be arranged in two annular rows, with the rows being at equal distances from the equator of the sphere, their arrangement in the pattern of a tetrahedron is preferred. FIGURE 6 shows such an arrangement.

A special type of bearing that optionally may be utilized is the superconductive magnetic bearing. Below certain temperatures, close to absolute zero, some conducting materials do not have any electrical resistance. The stabilizing arrangement that is mentioned above—of stabilizing coils and sphere—can be utilized with minimum power losses if the stabilizing coils and the sphere (or the sphere's surface) are made of superconductive materials, such as niobium or tin, or an alloy of one of these metals.

The dynamic balancing of the hollow sphere presents a problem. Since the surface of the sphere should remain smooth from the point of view of windage losses, its balancing is achieved by removing material from its inside. For this purpose the rotor, as indicated in FIGURE 6, preferably is made of two half-spheres, which are fixed together in their final assembly.

A combination of the magnetic torquer and magnetic suspension is shown in FIGURE 7. The torquer, comprising coils 26, 28 and 30, provides a rotating magnetic flux, as in an induction motor. The torque is controlled by varying the excitation of coils 26 and 28 relative to the constant excitation of coil 30, either by amplitude or by phase control. Coil 30 also has the function of providing magnetic suspension of the sphere. By means of the type of stabilizing network and amplifier shown in FIGURE 4, the amplitude of the current supplied to coil 30 is varied, thus automatically varying the magnetic force on the sphere, keeping it centered in its casing. The equation of torque equilibrium about the axis to be controlled gives $I_{sv}\ddot{\phi} + I_f\ddot{\alpha} = 0$, with $I_{sv}$=moment of inertia of space vehicle about axis to be controlled
$I_f$=moment of inertia of spherical flywheel
$\phi$=angular displacement of space vehicle, input signal (measured in a space direction fixed system)
$\alpha$=angular displacement of flywheel Dots above variables denote time derivatives.

The input signal $\phi$ should be differentiated to provide proper damping of the control mode. Sampling type or digital type differentiating methods are preferable to the commonly used analog methods in form of RC networks or to rate gyros since unusually low control frequencies are desirable from the viewpoint of low power needs. Thus, the input signal $\phi$ and its derivative $\dot{\phi}$ will cause, after proper amplification, the necessary motor torque and compensation of the inherent damping of the motor, which might be modified by a feedback of the angular rate $\dot{\alpha} - \dot{\phi}$:

$$a_0\phi + a_1\dot{\phi} = I_f\ddot{\alpha} + e(\dot{\alpha} - \dot{\phi}) \qquad (2)$$

Equations 1 and 2 yield the characteristic equations:

$$s^2 = 0 \qquad (3a)$$

and $$s^2 + s\left[e\left(\frac{1}{I_{sv}} + \frac{1}{I_f}\right) + \frac{a_1}{I_{sv}}\right] + \frac{a_0}{I_{sv}} = 0 \qquad (3b)$$

The two poles at $s=0$ allow for two initial conditions with respect to $\alpha$ and $\dot{\alpha}$. The initial displacement $\alpha$ of the flywheel is of no concern, whereas the initial value of the flywheel speed $\dot{\alpha}$ should be zero in order to have symmetrical starting conditions for the operating range of the control system. Thus, the stability of the flywheel control system is sufficiently described by Equation 3b.

Equation 3b indicates that the system behaves like a damped pendulum with the undamped natural frequency:

$$f_c = \frac{1}{2\pi}\sqrt{\frac{a_0}{I_{sv}}} \qquad (4a)$$

and the relative damping ratio:

$$\zeta = \frac{1}{2}\left[e\left(\frac{1}{I_{sv}} + \frac{1}{I_f}\right) + \frac{a_1}{I_{sv}}\right]\sqrt{\frac{I_{sv}}{a_0}} \qquad (4b)$$

The use of non-linear control characteristics such as amplitude dependent gain factors or a properly selected response zone will improve the overall efficiency of the control circuit. The former method results in reduced power requirements, while use of a dead zone permits conditional stability without special damping requirements. Further, no control power will be necessary when passing through the dead zone.

Figure 8:
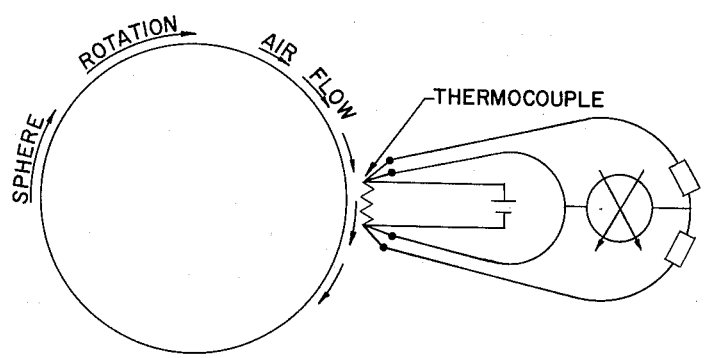
FIGURE 8 is a schematic view of a bolometric pickup for measuring and sending a signal of the speed of rotation of the sphere.
Figure 9:
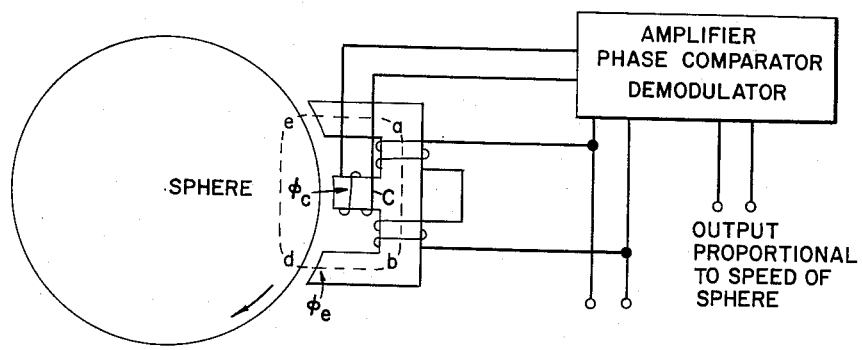
FIGURE 9 is a schematic view of an inductive pickup for measuring and signalling the speed of rotation of the sphere.

If conditional stability of the control loop due to non-linearities does not give sufficient dynamic stability, damping of the control loop, in addition to the inherent damping of the sphere due to losses, can be provided by a signal proportional to the speed of the sphere. Such signals may be derived by the following method:

Bolometric pickups as shown in FIGURE 8: Since the sphere rotates in air, an air flow exists around its surface which can be used for cooling a heating element. Its temperature difference measured by thermocouples at both ends in the bridge circuit shown produces a signal which is close to a linear function of the speed of the sphere. Optionally alternative methods of producing these signals are:

(a) Inductive types of pickups as shown in FIGURE 9 on a smooth sphere: The excitation A.C. flux $\phi_e$ along the path $a-b-d-e$ does not induce any voltage in coil $c$ as long as the sphere does not rotate around the axis normal to the magnetic flux. Such a rotation, however, will distort the magnetic flux distribution due to eddy currents in the sphere. The magnitude of voltage induced due to the unsymmetrical flux distribution in coil C of the middle core will be close to a linear function of the speed of the sphere, and its phase with respect to the excitation voltage allows a discrimination of the speed direction.

This can be shown by the following consideration, which is valid when a moderate speed of the sphere and thus a negligible current skin effect prevail. Then the magnetic flux $\phi_e$ produced by the excitation coils is constant and produces an E.M.F. in the rotating sphere proportional to to its speed. Since the sphere is an electrical conductor, this induced E.M.F. causes a current density and ampere turns that are proportional to the speed of the sphere, and directed in such a way that a magnetic cross flux $\phi_c$ is created, which induces a proportional voltage in coil C.

(b) Any known type of magnetic or optic pickup for measuring the time interval of pulses produced by a pattern marked on the sphere.

Within the scope of the subjoined claims, the invention comprehends various changes in the specific structure herein illustrated.

The following invention is claimed:

1. A device of the character described comprising: a space vehicle element; a support fixed to said element; low-friction bearing means carried by said support; a spherical, rotary, flywheel mass floatingly supported on said bearing means; means, fixed to said element, for selectively influencing a part of said spherical mass and urging said mass to rotate about a selected one of a multiplicity of axes thru the center of said mass, and for changing the attitude of said element in space due to the reaction from the rotary influence on said mass; means for supplying energy to said means, fixed to said element, for selectively influencing a part of said spherical mass and urging said mass to rotate about a selected one of a multiplicity of axes thru the center of said mass, and for changing the attitude of said element in space due to the reaction from the rotary influence on said mass; and an attitude-sensitive means, responsive to a change in the attitude of said element, for controlling said energy-supplying means.

2. A device as set forth in claim 1, in which said spherical flywheel mass is hollow.

3. A device as set forth in claim 1, in which said means for influencing a part of said spherical mass comprises gaseous jet nozzles, and said energy is fluid pressure.

4. A device as set forth in claim 1, in which said low-friction bearing means comprises a gaseous bearing.

5. A device as set forth in claim 1, which further comprises means for supplying a signal indicating the speed of said flywheel mass.

6. A device as set forth in claim 5, in which said signal-supplying means comprises a thermocouple juxtaposed to the outer surface of said flywheel mass.

7. A device as set forth in claim 5, in which said signal is an electric current and said signal-supplying means comprises electrical coils juxtaposed to the outer surface of said flywheel mass.

8. A device of the character described comprising: a space vehicle element; a support fixed to said element; low-friction bearing means carried by said support; a spherical, rotary, flywheel mass floatingly supported on said bearing means, said spherical mass having a non-magnetic inner portion and an outer, spherical portion of magnetic material; means, comprising a plurality of electrical coils, fixed to said element, for selectively influencing a part of said outer magnetic portion and urging said mass to rotate about a selected one of a multiplicity of axes thru the center of said mass, and for changing the attitude of said element in space due to the reaction from the rotary influence on said mass; means for supplying current to said coils; and an attitude-sensitive system, responsive to a change in the attitude of said element, electrically connected to said current-supplying means.

9. A device as set forth in claim 8, in which said non-magnetic portion is of plastic.

10. A device as set forth in claim 8, in which said outer, spherical portion comprises powdered ferrite in a matrix of plastic.

References Cited in the file of this patent

UNITED STATES PATENTS

| | | |
|---|---|---|
| 536,530 | Jordan | Mar. 26, 1895 |
| 2,734,383 | Paine | Feb. 14, 1956 |
| 2,857,122 | Maguire | Oct. 21, 1958 |
| 2,919,583 | Parker | Jan. 5, 1960 |
| 2,942,479 | Hollman | June 28, 1960 |